United States Patent
Kats et al.

(10) Patent No.: US 11,900,394 B1
(45) Date of Patent: Feb. 13, 2024

(54) LOCATION-BASED ANOMALY DETECTION BASED ON GEOTAGGED DIGITAL PHOTOGRAPHS

(71) Applicant: NortonLifeLock Inc., Tempe, AZ (US)

(72) Inventors: Daniel Kats, Culver City, CA (US); Kevin Alejandro Roundy, El Segundo, CA (US); Daniel Marino, Los Angeles, CA (US)

(73) Assignee: GEN DIGITAL INC., Tempe, AZ (US)

( * ) Notice: Subject to any disclaimer, the term of this patent is extended or adjusted under 35 U.S.C. 154(b) by 338 days.

(21) Appl. No.: 17/098,067

(22) Filed: Nov. 13, 2020

(51) Int. Cl.
*G06Q 30/018* (2023.01)
*G06Q 30/0204* (2023.01)
(Continued)

(52) U.S. Cl.
CPC ......... *G06Q 30/0185* (2013.01); *G06F 16/29* (2019.01); *G06F 16/587* (2019.01);
(Continued)

(58) Field of Classification Search
CPC .......... G06Q 30/0185; G06Q 20/1085; G06Q 20/407; G06Q 30/0205; G06Q 40/12;
(Continued)

(56) References Cited

U.S. PATENT DOCUMENTS 9,014,726 B1 * 4/2015 Foster ................... H04W 4/021
455/418
11,436,588 B1 * 9/2022 Roth ................... G06Q 30/0185
(Continued)

FOREIGN PATENT DOCUMENTS

KR      20140089537 A  *  7/2014
WO   WO-2009151928 A2 * 12/2009 ............. G06F 16/29
(Continued)

OTHER PUBLICATIONS

V. Singh, S. Venkatesha and A. K. Singh, "Geo-clustering of Images with Missing GeoTags," 2010 IEEE International Conference on Granular Computing, San Jose, CA, USA, 2010, pp. 420-425. (Year: 2010).*

(Continued)

*Primary Examiner* — Virpi H Kanervo
(74) *Attorney, Agent, or Firm* — MASCHOFF BRENNAN

(57) ABSTRACT

Location-based anomaly detection based on geotagged digital photographs. In some embodiments, a method may include identifying a completed transaction associated with a user. The method may also include determining a transaction geographic location associated with the completed transaction. The method may further include identifying a mobile device associated with the user. The method may also include identifying one or more geotagged digital photographs taken by the mobile device. The method may further include extracting one or more photograph geographic locations from the one or more geotagged digital photographs. The method may also include, in response to determining that the transaction geographic location is not within a threshold distance of any of the one or more photograph geographic locations, identifying the completed transaction as a suspicious transaction and performing a remedial action.

18 Claims, 3 Drawing Sheets

(51) Int. Cl.
  *G06Q 20/40* (2012.01)
  *G06Q 20/10* (2012.01)
  *G06Q 40/12* (2023.01)
  *G06F 16/587* (2019.01)
  *G06F 16/29* (2019.01)
  *G06V 20/10* (2022.01)
  *G06V 40/16* (2022.01)

(52) U.S. Cl.
  CPC ....... *G06Q 20/1085* (2013.01); *G06Q 20/407* (2013.01); *G06Q 30/0205* (2013.01); *G06Q 40/12* (2013.12); *G06V 20/10* (2022.01); *G06V 40/172* (2022.01)

(58) Field of Classification Search
  CPC ....... G06F 16/29; G06F 16/587; G06V 20/10; G06V 40/172
  USPC ....................................................... 705/7.34
  See application file for complete search history.

(56) References Cited

U.S. PATENT DOCUMENTS

2016/0057565 A1* 2/2016 Gold ..................... H04W 4/023
  455/41.1
2022/0103582 A1* 3/2022 Kidney ............... H04L 63/1425

FOREIGN PATENT DOCUMENTS

WO   WO-2018183618 A1 * 10/2018   ....... G06Q 10/06398
WO   WO-2021068031 A1 * 4/2021   ............. G01S 19/40

OTHER PUBLICATIONS

Hu et al. Extracting and understanding urban areas of interest using geotagged photos. Computers, Environment and Urban Systems. 54 (2015) 240-254. (Year: 2015).*

Priit Jarv. Extracting Human Mobility Data from Geotagged Photos. Proceedings of the 1st ACM Sigspatial Workshop on Prediction of Human Mobility. Nov. 2017, Article No. 4, pp. 1-7. (Year: 2017).*

* cited by examiner

LOCATION-BASED ANOMALY DETECTION BASED ON GEOTAGGED DIGITAL PHOTOGRAPHS

BACKGROUND

Fraudulent transactions are an increasing problem. Further, as the number of transactions per user increases over time, it is increasingly difficult to distinguish fraudulent transactions from legitimate transactions.

One method for detecting fraudulent transactions is to identify anomalies in user purchasing habits. However, conventional methods for identifying anomalies in user purchasing habits can require information that is difficult to obtain automatically, or information that users are unable or unwilling to provide due to concerns for user privacy. The limitations of conventional methods of detecting fraudulent transactions leaves users frequently exposed to the harm inherent in fraudulent transactions due to many fraudulent transactions never being identified and therefore never being addressed.

The subject matter claimed herein is not limited to embodiments that solve any disadvantages or that operate only in environments such as those described above. Rather, this background is only provided to illustrate one example technology area where some embodiments described herein may be practiced.

SUMMARY

In some embodiments, a computer-implemented method for location-based anomaly detection based on geotagged digital photographs may be performed, at least in part, by a computer including one or more processors. The method may include identifying a completed transaction associated with a user. The method may also include determining a transaction geographic location associated with the completed transaction. The method may further include identifying a mobile device associated with the user. The method may also include identifying one or more geotagged digital photographs taken by the mobile device. The method may further include extracting one or more photograph geographic locations from the one or more geotagged digital photographs. The method may also include, in response to determining that the transaction geographic location is not within a threshold distance of any of the one or more photograph geographic locations, identifying the completed transaction as a suspicious transaction and performing a remedial action.

In some embodiments, the performing of the remedial action may include one or more of presenting an alert on the mobile device informing the user of the suspicious transaction, presenting an option on the mobile device for the user to undo the suspicious transaction, marking the completed transaction as being suspicious on a display of the mobile device.

In some embodiments, the determining of the transaction geographic location associated with the completed transaction may include determining a geographic location of one or more of a business who is a party to the completed transaction, an automated teller machine at which the completed transaction occurred, a kiosk at which the completed transaction occurred, a delivery address of a product purchased in the completed transaction, or a service address of a service purchased in the completed transaction.

In some embodiments, the identifying of the one or more geotagged digital photographs taken by the mobile device may include extracting one or more mobile device identifiers from the one or more geotagged digital photographs, determining that the one or more mobile device identifiers match a device identifier of the mobile device associated with the user.

In some embodiments, the one or more geotagged digital photographs may further include geotagged digital photographs in which the user is identified through one or more of user tagging or facial recognition.

In some embodiments, the method may further include determining a transaction time period associated with the completed transaction, and extracting one or more photograph time periods from the one or more geotagged digital photographs. In these embodiments, the identifying of the completed transaction as the suspicious transaction and the performing of the remedial action may be further performed in response to determining that the transaction time period is not within a threshold time period of any of the one or more photograph time periods.

In some embodiments, the one or more geotagged digital photographs may be stored on a device that is separate from the mobile device.

In some embodiments, one or more non-transitory computer-readable media may include one or more computer-readable instructions that, when executed by one or more processors of a computer, cause the computer to perform a method for location-based anomaly detection based on geotagged digital photographs.

In some embodiments, a server may include one or more processors and one or more non-transitory computer-readable media. The one or more non-transitory computer-readable media may include one or more computer-readable instructions that, when executed by the one or more processors, cause the server to perform a method for location-based anomaly detection based on geotagged digital photographs.

It is to be understood that both the foregoing summary and the following detailed description are explanatory and are not restrictive of the invention as claimed.

BRIEF DESCRIPTION OF THE DRAWINGS

Embodiments will be described and explained with additional specificity and detail through the use of the accompanying drawings in which.

DETAILED DESCRIPTION

Figure 1:
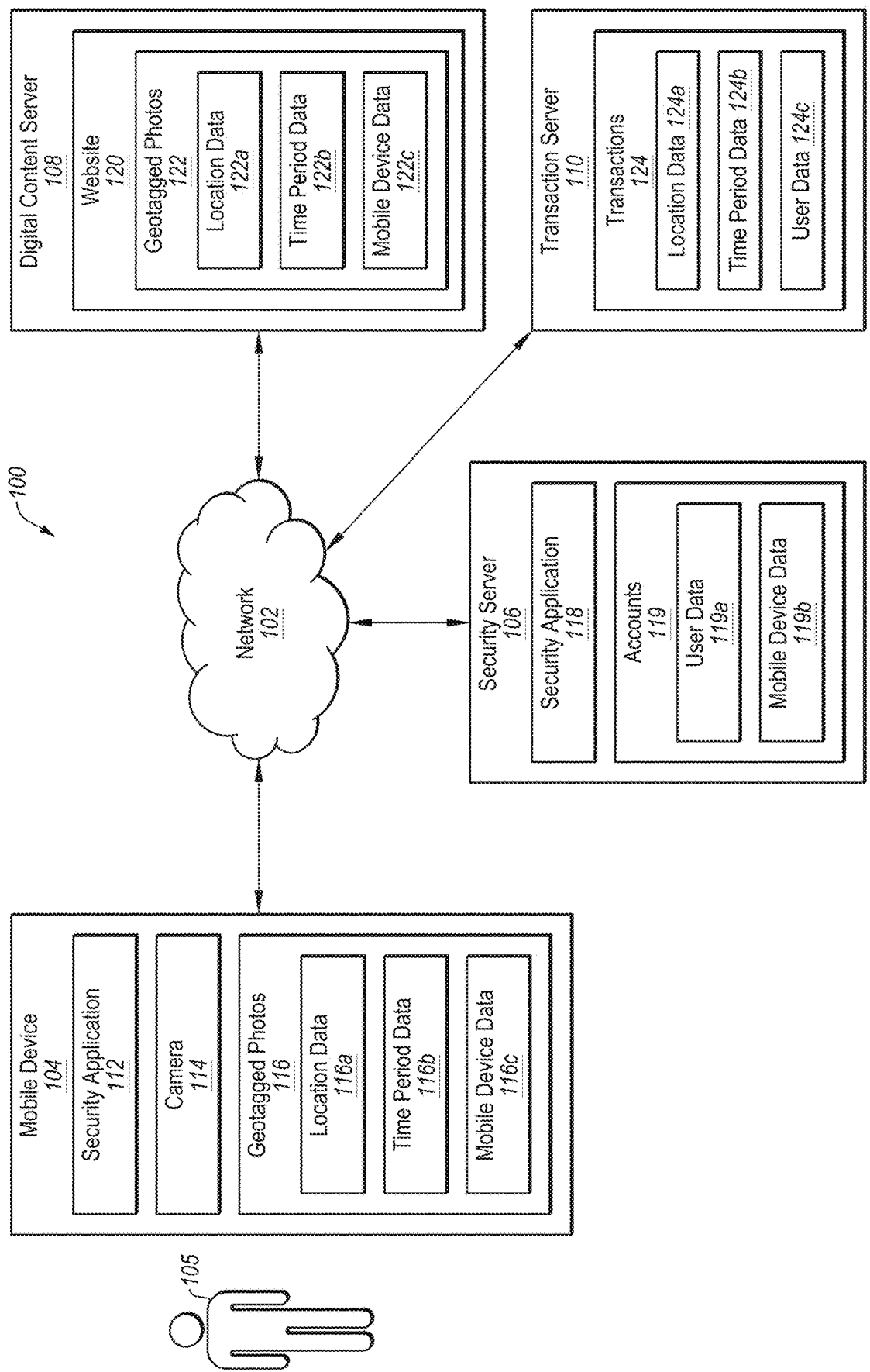
FIG. 1 illustrates an example system configured for location-based anomaly detection based on geotagged digital photographs.

Fraudulent transactions are an increasing problem, and it is difficult to distinguish fraudulent transactions from legitimate transactions. Conventional methods for identifying anomalies in user purchasing habits can require information that is difficult to obtain automatically, or information that users are unable or unwilling to provide due to concerns for user privacy. The limitations of conventional methods of detecting fraudulent transactions leaves users frequently exposed to the harm inherent in fraudulent transactions due to many fraudulent transactions never being identified and therefore never being addressed.

Some embodiments disclosed herein may enable location-based anomaly detection based on geotagged digital photographs. In particular, a geographic location of a completed transaction associated with a user may be compared to geographic locations extracted from digital photographs taken by a mobile device associated with the user. Where this comparison confirms that the user's mobile device was within a threshold distance of a geographic location of the completed transaction, the transaction may be allowed. Conversely, where this comparison is unable to confirm that the user's mobile device was within a threshold distance of a geographic location of the completed transaction, the completed transaction may be identified as a suspicious transaction and a remedial action may be performed. For example, where a user completes an automated teller machine (ATM) cash withdrawal in Paris, France, and the user has also taken one or more digital photographs with his mobile device while located in Paris, France in the same time period as the ATM cash withdrawal, the ATM cash withdrawal may be considered legitimate because the user was verified to have been physically present in Paris, France at the time of the ATM cash withdrawal. Conversely, where none of the digital photographs taken with the user's mobile device were taken while located anywhere near Paris, France in the same time period as the ATM cash withdrawal, the ATM cash withdrawal may be identified as a suspicious transaction and a remedial action may be performed (e.g., presenting an alert on the mobile device informing the user of the suspicious transaction, presenting an option on the mobile device for the user to undo the suspicious transaction, marking the completed transaction as being suspicious on a display of the mobile device, etc.). In this manner, embodiments disclosed herein may enable geotagged digital photographs to be used to distinguish fraudulent transactions from legitimate transactions. Further, since a geographic location where a digital photograph was taken may be automatically stored in a geotagged digital photograph, embodiments disclosed herein may easily and automatically obtain the information needed to distinguish fraudulent transactions from legitimate transactions. Further, unlike conventional methods which require constant tracking of a user's geographic location, which the user may feel is overly intrusive of the user's privacy, embodiments disclosed herein may be employed to only periodically track a user's geographic location (e.g., by only gathering a user's geographic location from periodically taken geotagged digital photographs to construct a personalized pattern of local behavior for the user) which the user may feel is less intrusive of the user's privacy. Therefore, some embodiments disclosed herein may overcome the limitations of conventional methods of detecting fraudulent transactions, resulting in less frequent undetected and unaddressed fraudulent transactions.

Turning to the figures, FIG. 1 illustrates an example system 100 configured for location-based anomaly detection based on geotagged digital photographs. The system 100 may include a network 102, a mobile device 104, a security server 106, a digital content server 108, and a transaction server 110.

In some embodiments, the network 102 may be configured to communicatively couple the mobile device 104, the security server 106, the digital content server 108, and the transaction server 110 to one another, and to other network devices, using one or more network protocols, such as the network protocols available in connection with the World Wide Web. In some embodiments, the network 102 may be any wired or wireless network, or combination of multiple networks, configured to send and receive communications (e.g., via data packets) between systems and devices. In some embodiments, the network 102 may include a Personal Area Network (PAN), a Local Area Network (LAN), a Metropolitan Area Network (MAN), a Wide Area Network (WAN), a Storage Area Network (SAN), a telephone network, a cellular network, the Internet, or some combination thereof.

Figure 3:
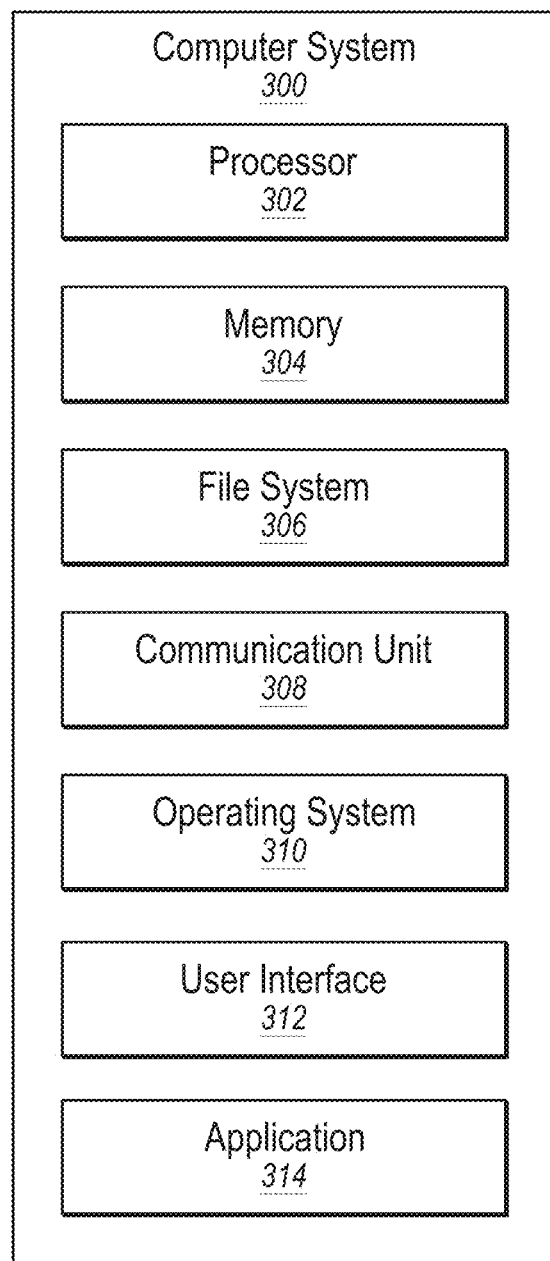
FIG. 3 illustrates an example computer system that may be employed in location-based anomaly detection based on geotagged digital photographs.

In some embodiments, the mobile device 104 may be any computer system, or combination of multiple computer systems, capable of communicating over the network 102 and capable of executing the security application 112, examples of which are disclosed herein in connection with the computer system 300 of FIG. 3. In some embodiments, the security application may be, or may include some or all of the functionality of, NortonLifeLock's LifeLock ID Theft Protection app or LifeLock Identity app. The security application 112 may be configured to access geotagged photos 116 taken by the mobile device 104 using the camera 114. For example, the user 105 may grant the security application 112 permission to access digital photos stored on the mobile device 104. As used herein, the term "geotagged photo" or "geotagged digital photograph" refers to a digital photograph or a digital video (e.g., that is made up of a series of digital photographs) that is automatically associated with a geographic location where the digital photograph was taken using geotagging. A geotag generally identifies a geographic location, such as by identifying a latitude and a longitude, as well as potentially identifying an altitude, a compass bearing, a street address, and/or other fields. The geographic location included in a geotag may be generated, at the time a digital photograph is taken, using a GPS receiver or some other method of determining a geographic location. The security application 112 may access the geotagged photos 116 in order to extract various data from the geotagged photos, such as location data 116$a$ (e.g., the geographic location where the geotagged photo was taken), time period data 116$b$ (e.g., the time period when the geotagged photo was taken, such as a timestamp or a date), and mobile device data 116$c$ (e.g., a mobile device identifier, such as a MAC address, that uniquely identifies the mobile device on which the digital photo was taken).

In some embodiments, the digital content server 108 may be any computer system, or combination of multiple computer systems, capable of communicating over the network 102 and capable of hosting digital content, examples of which are disclosed herein in connection with the computer system 300 of FIG. 3. The digital content server 108 may include digital content that is addressable on one or more particular domains, such as digital content hosted on a website 120. For example, the website 120 may be a cloud storage website, a social media website (e.g., Facebook, WhatsApp, Instagram, Snapchat, etc.), a database website, a digital photograph sharing website (e.g., wix.com, photos-.google.com, imgur.com, dropbox.com, flicker.com, 500px.com, pixabay.com, etc.), or some combination thereof. For example, the digital content server 108 may host geotagged photos 122 on the website 120. Similar to the geotagged photos 116, the geotagged photos 122 may include various data, such as location data 122$a$, time period data 122$b$, and mobile device data 122$c$. In some embodiments, the geotagged photos 122 may be copies of geotagged photos that were uploaded to the digital content server 108 from one or more camera-enabled mobile devices. For example, the geotagged photos 122 may be copies of the geotagged photos 116 that were uploaded to the website 120 from the mobile device 104. In some embodiments, the security application 112 may access the geotagged photos 116 as well as the geotagged photos 122 in order to extract various data from the geotagged photos (e.g., the user 105 may provide login credentials for the website 120 to the security application 112 so that the security application 112 may access the geotagged photos 122).

In some embodiments, the transaction server 110 may be any computer system, or combination of multiple computer systems, capable of communicating over the network 102 and capable of executing one or more transactions 124 and/or capable of storing data associated with transactions 124, examples of which are disclosed herein in connection with the computer system 300 of FIG. 3. The transactions 124 may be associated with various data, including location data 124*a* (e.g., the geographic location where the transaction took place), time period data 124*b* (e.g., the time period when the transaction took place, such as a timestamp or a date), and user data 124*c* (e.g., data associated with the user who was a party to the transaction, such as a user's name, account number, or unique identifier such as social security number, driver's license number, etc.). Each time that the user 105 is a party to a transaction 124, data associated with the transaction 124 may be stored at the transaction server 110. In some embodiments, the transaction server 110 may be associated with a business with whom the user 105 has a financial account (e.g., a bank, a credit card company, or broker). In some embodiments, the user 105 may provide the security application 112 and/or the security application 118 permission to access transactions of the user 105 on the transaction server 110, such as by providing these applications with login credentials of the user 105 to the transaction server 110.

In some embodiments, the security server 106 may be any computer system, or combination of multiple computer systems, capable of communicating over the network 102 and capable of executing a security application 118, examples of which are disclosed herein in connection with the computer system 300 of FIG. 3. In some embodiments, the security server 106 may also include, or be associated with, accounts 119, which may be employed to associate user data 119*a* (e.g., data associated with a user, such as a user's name, account number, or unique identifier such as social security number, driver's license number, etc.) with mobile device data 119*b* (e.g., a mobile device identifier that uniquely identifies the mobile device of the user). By associating the user data 119*a* with the mobile device data 119*b*, a particular user (e.g., the user 105) may be associated with a particular mobile device (e.g., the mobile device 104). The security application 118 may be configured to function in connection with, or in place of, the security application 112, and may be configured to access the geotagged photos 116 and/or the geotagged photos 122 in order to extract various data from the geotagged photos.

Modifications, additions, or omissions may be made to the system 100 without departing from the scope of the present disclosure. For example, in some embodiments, the system 100 may include additional components similar to the components illustrated in FIG. 1 that each may be configured similarly to the components illustrated in FIG. 1.

Figure 2:
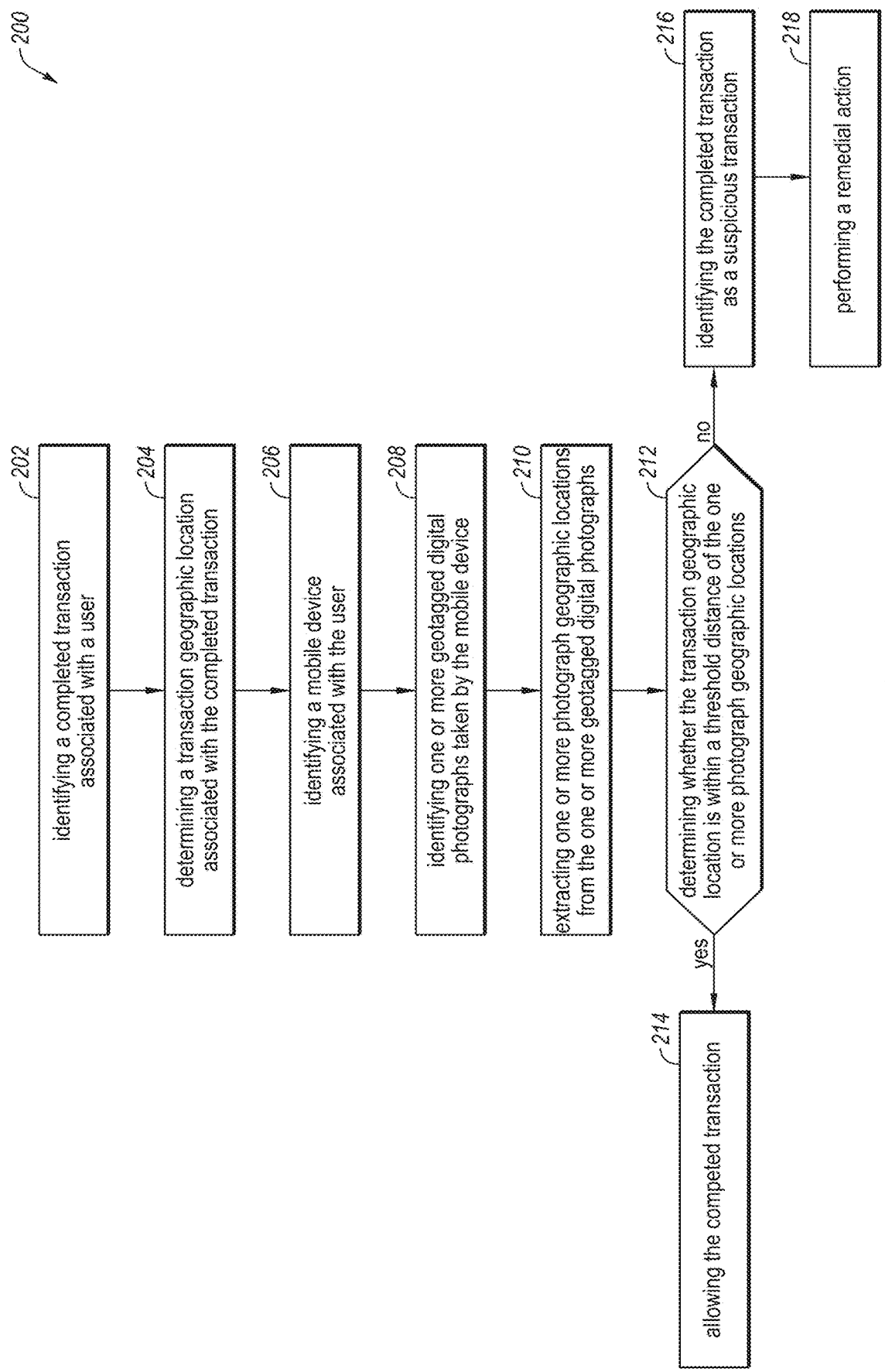
FIG. 2 is a flowchart of an example method for location-based anomaly detection based on geotagged digital photographs.

FIG. 2 is a flowchart of an example method 200 for location-based anomaly detection based on geotagged digital photographs. The method 200 may be performed, in some embodiments, by a device or system or application, such as by the mobile device 104, the security application 112, the security server 106, or the security application 118, or some combination thereof. In these and other embodiments, the method 200 may be performed by one or more processors based on one or more computer-readable instructions stored on one or more non-transitory computer-readable media. The method 200 will now be described in connection with FIGS. 1 and 2.

In some embodiments, the method 200 may be performed periodically in order to protect one or more accounts associated with a particular user in order to identify any suspicious transactions on the accounts. For example, the method 200 may be performed periodically to monitor each transaction 124 at the transaction server 110 in order to protect accounts associated with the user 105 (e.g., bank accounts, credit card accounts, brokerage accounts, etc.) in order to identify any suspicious transactions on the accounts. In some embodiments, the security application 112 and/or the security application 118 may aggregate transactions from a number of accounts (e.g., debit card accounts, credit card accounts, etc.) in near-real-time. In some embodiments, the security application 112 and/or the security application 118 may also receive transaction data in bulk (e.g., when the user 105 returns from a trip where they were without mobile internet access, or as part of a data import).

The method 200 may include, at action 202, identifying a completed transaction associated with a user. For example, the security application 112 and/or the security application 118 may identify the transaction 124 as being completed and as being associated with the user 105 because the user data 124*c* is associated with the user 105.

The method 200 may include, at action 204, determining a transaction geographic location associated with the completed transaction. In some embodiments, the determining of the transaction geographic location associated with the completed transaction may include determining a geographic location of one or more of a business who is a party to the completed transaction, an automated teller machine (ATM) at which the completed transaction occurred, a kiosk at which the completed transaction occurred, a delivery address of a product purchased in the completed transaction, or a service address of a service purchased in the completed transaction. For example, the security application 112 and/or the security application 118 may determine a transaction geographic location associated with the transaction 124 (e.g., a geographic location of an ATM where money was withdrawn, of a store where a product was purchased, of a residence where a food order was delivered, etc.) from the location data 124*a* of the transaction 124. In some embodiments, it may be possible to infer the transaction geographic location (e.g., based on a vendor name and/or vendor address, and/or metadata that indicates whether a card was physically present, whether the transaction took place online, etc.).

The method 200 may include, at action 206, identifying a mobile device associated with the user. For example, the security application 112 and/or the security application 118 may identify that the mobile device 104 is associated with the user 105 from the user data 119*a* and the mobile device data 119*b* of the accounts 119. In some embodiments, the security application 112 and/or the security application 118 may employ any other method of determining that the mobile device 104 is associated with the user 105, such as by inferring such an association given that the user 105 is logged into the security application 112 and given that the security application 112 is installed on the mobile device 104.

The method 200 may include, at action 208, identifying one or more geotagged digital photographs taken by the mobile device. In some embodiments, the identifying of the one or more geotagged digital photographs taken by the mobile device may include extracting one or more mobile device identifiers from the one or more geotagged digital photographs, determining that the one or more mobile device identifiers match a device identifier of the mobile device associated with the user. In some embodiments, the one or more geotagged digital photographs may be stored on a device that is separate from the mobile device. For example, the security application 112 and/or the security application 118 may identify the geotagged photos 116 and/or the geotagged photos 122 as having been taken by the mobile device 104 from the mobile device data 116c and/or the mobile device data 122c (e.g., by comparing the MAC address of the mobile device 104 to the MAC addresses in the mobile device data 116c and/or the mobile device data 122c). In some embodiments, the mobile device data 116c may be employed even where the geotagged photos 116 are stored on the mobile device 104 because the geotagged photos 116 may be taken by another device and then later stored on the mobile device 104.

In some embodiments, the one or more geotagged digital photographs identified at action 208 may further include geotagged digital photographs in which the user is identified through one or more of user tagging or facial recognition. For example, the security application 112 and/or the security application 118 may add to the geotagged digital photographs (that were identified at action 208) any of the geotagged photos 116 and/or the geotagged photos 122 in which the user 105 is tagged (e.g., on a social media website) or in which the user 105 is identified using facial recognition technology, even where the mobile device data 116c or the mobile device data 122c indicate that the geotagged photo was not taken by the mobile device 104. In these embodiments, the fact that the user 105 appears in the geotagged photo may be used to infer that the user 105 was physically present at the geographic location where the geotagged photo was taken, even if the mobile device 104 of the user 105 was not used to take the geotagged photo.

The method 200 may include, at action 210, extracting one or more photograph geographic locations from the one or more geotagged digital photographs. For example, the security application 112 and/or the security application 118 may extract photograph geographic locations from the location data 116a of the geotagged photos 116 and/or from the location data 122a of the geotagged photos 122.

The method 200 may include, at action 212, determining whether the transaction geographic location is within a threshold distance of any of the one or more photograph geographic locations. If so (yes at action 212), the method 200 may proceed to action 214. If not (no at action 212), the method 200 may proceed to action 216. For example, the security application 112 and/or the security application 118 may determine whether the transaction geographic location is within a threshold distance (e.g., 50 yards, 500 yards, 1 miles, 10 miles, 50 miles, 100 miles, etc.) of any of the photograph geographic locations extracted from the geotagged photos 116 and/or from the geotagged photos 122. The threshold distance may be preset by the user 105 or by an administrator of the security application 112 and/or of the security application 118, or may be determined dynamically based on, for example, the type of transaction (e.g., ATM transactions may have a smaller threshold distance, such as 50 yards, while food delivery transactions may have a larger threshold distance, such as 10 miles). In some embodiments, the threshold distance may be determined using standard commuting metrics, or by matching against other available data such as travel itineraries or photo locations corresponding to travel termini such as airports.

The method 200 may include, at action 214, allowing the competed transaction. For example, the security application 112 and/or the security application 118 may allow the transaction 124 by simply considering the transaction to be legitimate and not flagging the transaction as suspicious.

The method 200 may include, at action 216, identifying the completed transaction as a suspicious transaction and, at action 318, performing a remedial action. In some embodiments, the performing of the remedial action may include one or more of presenting an alert on the mobile device informing the user of the suspicious transaction, presenting an option on the mobile device for the user to undo the suspicious transaction, marking the completed transaction as being suspicious on a display of the mobile device. For example, the security application 112 and/or the security application 118 may identify the transaction 124 as a suspicious transaction and perform a remedial action, such as presenting an alert on the mobile device 104 (e.g., an alert in the security application 112) informing the user 105 of the suspicious transaction, presenting an option on the mobile device 104 (e.g., an option in the security application 112) for the user 105 to undo the suspicious transaction (e.g., by automatically reporting the transaction as fraudulent to have the transaction reversed by a bank or credit card company), or marking the completed transaction as being suspicious on a display of the mobile device 104 (e.g., in a list of recent transactions in the security application 112), or some combination thereof.

In some embodiments, the method 200 may further include determining a transaction time period associated with the completed transaction, and extracting one or more photograph time periods from the one or more geotagged digital photographs. In these embodiments, the identifying of the completed transaction as the suspicious transaction at action 216 and the performing of the remedial action at action 218 may be further performed in response to determining that the transaction time period is not within a threshold time period of any of the one or more photograph time periods. For example, the security application 112 and/or the security application 118 may determine a transaction time period of the transaction 124 from the time period data 124b, and may extract photograph time periods from the time period data 116b of the geotagged photos 116 and/or from the time period data 122b of the geotagged photos 122. Then the security application 112 and/or the security application 118 may identify the transaction 124 as a suspicious transaction and perform the remedial action in response to determining that the transaction time period is not within a threshold time period (e.g., 1 hour, 5 hours, 12 hours, 1 day, 1 week, 1 month, etc.) of any of the one or more photograph time periods. Further, the method 200 may also include identifying one or more travel geographic locations associated with the one or more photograph geographic locations. In these embodiments, the identifying of the completed transaction as the suspicious transaction at action 216 and the performing of the remedial action at action 218 may be further performed in response to determining that the transaction time period and transaction geographic location is not within a threshold travel time period and not with within a threshold travel distance of any of the one or more travel geographic locations. For example, the security application 112 and/or the security application 118 may identify a travel geographic location (e.g., of an airport, of a bus station, of a train station, of a cruise ship terminal, etc.) associated with a photograph geographic location in the location data 116a. Then the security application 112 and/or the security application 118 may identify the transaction 124 as a suspicious transaction and perform the remedial action in response to determining that the transaction time period is not within a threshold travel time period (e.g., 1 hour, 5 hours, 12 hours, 1 day, etc.) and is not within a threshold travel distance (e.g., 100 miles, 1000 miles, 10,000 miles, etc.) of any of the one or more travel geographic locations. In this example, a probabilistic curve may be employed rather than an absolute determination. For example, if a geotagged photo 116 is taken at an airport, then seeing a transaction in another country within a threshold travel time period may be more likely. However, while it might be possible a user to travel to Europe or Asia from a particular airport 24 hours, it may be quite unlikely that the user would do so. Therefore, the method 200 may consider a probabilistic model for fraudulent transactions in distant locations based on travel time, travel history, and specific photo geographic locations that make travel more likely such as airports and train stations.

In some embodiments, the method 200 may be employed even where the security application 112 and/or the security application 118 was not installed, or in use by the user 105, at the time one or more transactions were completed. For example, even where the security application 112 is installed by the user 105 on the mobile device 104 long after old transactions were completed, once the security application 112 is eventually installed on the mobile device 104, the security application 112 may be employed to go back and check old transactions for suspicious transactions using old geotagged photos. Therefore, the method may be employed on both near-real-time transaction data as well as historical transaction data.

In some embodiments, where an initial fraudulent transaction is identified using the method 200, additional potentially fraudulent historical transactions may be identified using a simple belief propagation algorithm over a bipartite graph where nodes in partition A are transactions, nodes in partition B are locations, and belief is probability of fraud. In some embodiments, a topological embedding may be used with the fourth dimension as time, and distance from legitimate transactions to indicate likelihood of fraud. The parameters may then be adjusted using online learning as the user selects or deselects suspected instances of fraud. These embodiments may be useful in the case of fraud over multiple transactions, as is common in credit card fraud.

In some embodiments, the method 200, and especially the action 212, may be employed in connection with one or more other methods of detecting a user's geographic location, such as by using a probability density function as to where the user might be during a transaction time period (to handle ambiguity).

The method 200 may thus be employed, in some embodiments, to enable the geotagged photos 116 and/or the geotagged photos 122 to be used to distinguish fraudulent transactions from legitimate transactions. Further, since a geographic location where a digital photo was taken may be automatically stored in a geotagged photo, the method 200 may easily and automatically obtain the information needed to distinguish fraudulent transactions from legitimate transactions. Further, unlike conventional methods which require constant tracking of a geographic location of the user 105, which the user 105 may feel is overly intrusive of the privacy of the user 105, the method 200 may be employed to only periodically track the geographic location of the user 105 (e.g., by only gathering the geographic location of the user 105 from periodically taken geotagged photos to construct a personalized pattern of local behavior for the user 105) which the user 105 may feel is less intrusive of their privacy. Therefore, the method 200 may overcome the limitations of conventional methods of detecting fraudulent transactions, resulting in less frequent undetected and unaddressed fraudulent transactions.

Although the actions of the method 200 are illustrated in FIG. 2 as discrete actions, various actions may be divided into additional actions, combined into fewer actions, reordered, expanded, or eliminated, depending on the desired implementation. For example, in some embodiments, action 214 may be eliminated.

Further, it is understood that the method 200 may improve the functioning of a computer system itself and/or may improve the technical field of automated anomaly detection. For example, the functioning of the mobile device 104 and/or the security server 106 of FIG. 1 may itself be improved by the method 200 automatically using geotagged digital photographs to distinguish fraudulent transactions from legitimate transactions more effectively than conventional systems, which do not use geotagged digital photographs.

Although the method 200 is disclosed herein in connection with identifying potentially fraudulent transactions, it is understood that the method 200 may be modified to be applied to any other event where the geographic location of a user overlapping with a geographic location associated with the event can be used to verify that the event is legitimate. Examples may include verifying a user's attendance at an event, verifying a user's primary residence, verifying a user's interaction with another user, etc.

FIG. 3 illustrates an example computer system 300 that may be employed in location-based anomaly detection based on geotagged digital photographs. In some embodiments, the computer system 300 may be part of any of the systems or devices described in this disclosure. For example, the computer system 300 may be part of any of the mobile device 104, the security server 106, the digital content server 108, and the transaction server 110 of FIG. 1.

The computer system 300 may include a processor 302, a memory 304, a file system 306, a communication unit 308, an operating system 310, a user interface 312, and an application 314, which all may be communicatively coupled. In some embodiments, the computer system may be, for example, a desktop computer, a client computer, a server computer, a mobile phone, a laptop computer, a smartphone, a smartwatch, a tablet computer, a portable music player, or any other computer system.

Generally, the processor 302 may include any suitable special-purpose or general- purpose computer, computing entity, or processing device including various computer hardware or software applications and may be configured to execute instructions stored on any applicable computer-readable storage media. For example, the processor 302 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data, or any combination thereof. In some embodiments, the processor 302 may interpret and/or execute program instructions and/or process data stored in the memory 304 and/or the file system 306. In some embodiments, the processor 302 may fetch program instructions from the file system 306 and load the program instructions into the memory 304. After the program instructions are loaded into the memory 304, the processor 302 may execute the program instructions. In some embodiments, the instructions may include the processor 302 performing one or more actions of the method 200 of FIG. 2.

The memory 304 and the file system 306 may include computer-readable storage media for carrying or having stored thereon computer-executable instructions or data structures. Such computer-readable storage media may be any available non-transitory media that may be accessed by a general-purpose or special-purpose computer, such as the processor 302. By way of example, and not limitation, such computer-readable storage media may include non-transitory computer-readable storage media including Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage media which may be used to carry or store desired program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the processor 302 to perform a certain operation or group of operations, such as one or more actions of the method 200 of FIG. 2. These computer-executable instructions may be included, for example, in the operating system 310, in one or more applications, such as the security application 112 or the security application 118 of FIG. 1, or in some combination thereof.

The communication unit 308 may include any component, device, system, or combination thereof configured to transmit or receive information over a network, such as the network 102 of FIG. 1. In some embodiments, the communication unit 308 may communicate with other devices at other locations, the same location, or even other components within the same system. For example, the communication unit 308 may include a modem, a network card (wireless or wired), an infrared communication device, a wireless communication device (such as an antenna), and/or chipset (such as a Bluetooth device, an 802.6 device (e.g., Metropolitan Area Network (MAN)), a WiFi device, a WiMax device, a cellular communication device, etc.), and/or the like. The communication unit 308 may permit data to be exchanged with a network and/or any other devices or systems, such as those described in the present disclosure.

The operating system 310 may be configured to manage hardware and software resources of the computer system 300 and configured to provide common services for the computer system 300.

The user interface 312 may include any device configured to allow a user to interface with the computer system 300. For example, the user interface 312 may include a display, such as an LCD, LED, or other display, that is configured to present video, text, application user interfaces, and other data as directed by the processor 302. The user interface 312 may further include a mouse, a track pad, a keyboard, a touchscreen, volume controls, other buttons, a speaker, a microphone, a camera, any peripheral device, or other input or output device. The user interface 312 may receive input from a user and provide the input to the processor 302. Similarly, the user interface 312 may present output to a user.

The application 314 may be one or more computer-readable instructions stored on one or more non-transitory computer-readable media, such as the memory 304 or the file system 306, that, when executed by the processor 302, is configured to perform one or more actions of the method 200 of FIG. 2. In some embodiments, the application 314 (e.g., app) may be part of the operating system 310 or may be part of an application of the computer system 300, or may be some combination thereof. In some embodiments, the application 314 may function as any of the security application 112 or the security application 118 of FIG. 1.

Modifications, additions, or omissions may be made to the computer system 300 without departing from the scope of the present disclosure. For example, although each is illustrated as a single component in FIG. 3, any of the components 302-314 of the computer system 300 may include multiple similar components that function collectively and are communicatively coupled. Further, although illustrated as a single computer system, it is understood that the computer system 300 may include multiple physical or virtual computer systems that are networked together, such as in a cloud computing environment, a multitenancy environment, or a virtualization environment.

As indicated above, the embodiments described herein may include the use of a special purpose or general-purpose computer (e.g., the processor 302 of FIG. 3) including various computer hardware or software applications, as discussed in greater detail below. Further, as indicated above, embodiments described herein may be implemented using computer-readable media (e.g., the memory 304 or file system 306 of FIG. 3) for carrying or having computer-executable instructions or data structures stored thereon.

In some embodiments, the different components and applications described herein may be implemented as objects or processes that execute on a computer system (e.g., as separate threads). While some of the methods described herein are generally described as being implemented in software (stored on and/or executed by general purpose hardware), specific hardware implementations or a combination of software and specific hardware implementations are also possible and contemplated.

In accordance with common practice, the various features illustrated in the drawings may not be drawn to scale. The illustrations presented in the present disclosure are not meant to be actual views of any particular apparatus (e.g., device, system, etc.) or method, but are merely example representations that are employed to describe various embodiments of the disclosure. Accordingly, the dimensions of the various features may be arbitrarily expanded or reduced for clarity. In addition, some of the drawings may be simplified for clarity. Thus, the drawings may not depict all of the components of a given apparatus (e.g., device) or all operations of a particular method.

Terms used herein and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, it is understood that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc. For example, the use of the term "and/or" is intended to be construed in this manner.

Further, any disjunctive word or phrase presenting two or more alternative terms, whether in the summary, detailed description, claims, or drawings, should be understood to contemplate the possibilities of including one of the terms, either of the terms, or both terms. For example, the phrase "A or B" should be understood to include the possibilities of "A" or "B" or "A and B."

Additionally, the use of the terms "first," "second," "third," etc., are not necessarily used herein to connote a specific order or number of elements. Generally, the terms "first," "second," "third," etc., are used to distinguish between different elements as generic identifiers. Absence a showing that the terms "first," "second," "third," etc., connote a specific order, these terms should not be understood to connote a specific order. Furthermore, absence a showing that the terms first," "second," "third," etc., connote a specific number of elements, these terms should not be understood to connote a specific number of elements. For example, a first widget may be described as having a first side and a second widget may be described as having a second side. The use of the term "second side" with respect to the second widget may be to distinguish such side of the second widget from the "first side" of the first widget and not to connote that the second widget has two sides.

The foregoing description, for purpose of explanation, has been described with reference to specific embodiments. However, the illustrative discussions above are not intended to be exhaustive or to limit the invention as claimed to the precise forms disclosed. Many modifications and variations are possible in view of the above teachings. The embodiments were chosen and described to explain practical applications, to thereby enable others skilled in the art to utilize the invention as claimed and various embodiments with various modifications as may be suited to the particular use contemplated.

The invention claimed is:

1. A computer-implemented method for location-based anomaly detection based on geotagged digital photographs, at least a portion of the method being performed by a computer comprising one or more processors, the method comprising:
   identifying, by a processor, a completed transaction associated with a user, wherein the completed transaction is a financial transaction between the user and a third party;
   determining, by the processor, a transaction geographic location and a transaction time period associated with the completed transaction;
   identifying, by the processor, a mobile device associated with the user;
   identifying, by the processor, one or more geotagged digital photographs taken by the mobile device, wherein the mobile device includes a global positioning system (GPS) receiver that identifies photograph geographic locations for each of the one or more geotagged digital photographs;
   extracting, by the processor, the photograph geographic locations from each of the one or more geotagged digital photographs and determining threshold distances from each of the photograph geographic locations;
   determining, by the processor, that the transaction geographic location is not within a threshold distance of the photograph geographic locations of the one or more geotagged digital photographs; and
   performing a remedial action, wherein performing the remedial action includes:
   presenting an alert on the mobile device informing the user of a suspicious transaction,
   presenting an option on the mobile device for the user to undo the suspicious transaction, or
   marking the completed transaction as being suspicious on a display of the mobile device.

2. The method of claim 1, wherein determining the transaction geographic location associated with the completed transaction includes determining a geographic location of:
   a business who is a party to the completed transaction,
   an automated teller machine at which the completed transaction occurred,
   a kiosk at which the completed transaction occurred,
   a delivery address of a product purchased in the completed transaction, or
   a service address of a service purchased in the completed transaction.

3. The method of claim 1, wherein identifying the one or more geotagged digital photographs taken by the mobile device includes:
   extracting one or more mobile device identifiers from the one or more geotagged digital photographs; and
   determining that the one or more mobile device identifiers match a device identifier of the mobile device associated with the user.

4. The method of claim 1, wherein the one or more geotagged digital photographs further comprise geotagged digital photographs in which the user is identified through:
   user tagging, or
   facial recognition.

5. The method of claim 1, wherein the one or more geotagged digital photographs are stored on a device that is separate from the mobile device.

6. The method of claim 1, further comprising:
   extracting, by the processor, photograph time periods from each of the one or more geotagged digital photographs and determining threshold time periods from each of the one or more photograph time periods; and
   determining, by the processor, that the transaction time period is not within the threshold time periods of one or more of the photograph time periods.

7. One or more non-transitory computer-readable media comprising one or more computer-readable instructions that, when executed by one or more processors of a computer, cause the computer to perform a method for location-based anomaly detection based on geotagged digital photographs, the method comprising:

identifying, by a processor, a completed transaction associated with a user, wherein the completed transaction is a financial transaction between the user and a third party;

determining, by the processor, a transaction geographic location and a transaction time period associated with the completed transaction;

identifying, by the processor, a mobile device associated with the user;

identifying, by the processor, one or more geotagged digital photographs taken by the mobile device, wherein the mobile device includes a global positioning system (GPS) receiver that identifies photograph geographic locations for each of the one or more geotagged digital photographs;

extracting, by the processor, the photograph geographic locations from each of the one or more geotagged digital photographs and determining threshold distances from each of the photograph geographic locations;

determining, by the processor, that the transaction geographic location is not within a threshold distance of the photograph geographic locations of the one or more geotagged digital photographs; and performing a remedial action, wherein performing the remedial action includes:

presenting an alert on the mobile device informing the user of a suspicious transaction, presenting an option on the mobile device for the user to undo the suspicious transaction, or marking the completed transaction as being suspicious on a display of the mobile device.

8. The one or more non-transitory computer-readable media of claim 7, wherein determining the transaction geographic location associated with the completed transaction includes determining a geographic location of:

a business who is a party to the completed transaction, an automated teller machine at which the completed transaction occurred, a kiosk at which the completed transaction occurred, a delivery address of a product purchased in the completed transaction, or a service address of a service purchased in the completed transaction.

9. The one or more non-transitory computer-readable media of claim 7, wherein identifying the one or more geotagged digital photographs taken by the mobile device includes:

extracting one or more mobile device identifiers from the one or more geotagged digital photographs; and determining that the one or more mobile device identifiers match a device identifier of the mobile device associated with the user.

10. The one or more non-transitory computer-readable media of claim 7, wherein the one or more geotagged digital photographs further comprise geotagged digital photographs in which the user is identified through:

user tagging, or facial recognition.

11. The one or more non-transitory computer-readable media of claim 7, wherein the one or more geotagged digital photographs are stored on a device that is separate from the mobile device.

12. The one or more non-transitory computer-readable media of claim 7, further comprising:

extracting, by the processor, photograph time periods from each of the one or more geotagged digital photographs and determining threshold time periods from each of the one or more photograph time periods; and determining that the transaction time period is not within the threshold time periods of one or more of the photograph time periods.

13. A server comprising:

one or more processors; and one or more non-transitory computer-readable media comprising one or more computer-readable instructions that, when executed by the one or more processors, cause the server to perform a method for location-based anomaly detection based on geotagged digital photographs, the method comprising:

identifying a completed transaction associated with a user, wherein the completed transaction is a financial transaction between the user and a third party;

determining a transaction geographic location and a transaction time period associated with the completed transaction;

identifying a mobile device associated with the user;

identifying one or more geotagged digital photographs taken by the mobile device, wherein the mobile device includes a global positioning system (GPS) receiver that identifies photograph geographic locations for each of the one or more geotagged digital photographs;

extracting the photograph geographic locations from each of the one or more geotagged digital photographs and determining threshold distances from each of the photograph geographic locations;

determining that the transaction geographic location is not within a threshold distance of the photograph geographic locations of the one or more geotagged digital photographs; and performing a remedial action, wherein performing the remedial action includes:

presenting an alert on the mobile device informing the user of the suspicious transaction, presenting an option on the mobile device for the user to undo the suspicious transaction, or marking the completed transaction as being suspicious on a display of the mobile device.

14. The server of claim 13, wherein determining the transaction geographic location associated with the completed transaction includes determining a geographic location of:

a business who is a party to the completed transaction, an automated teller machine at which the completed transaction occurred, a kiosk at which the completed transaction occurred, a delivery address of a product purchased in the completed transaction, or a service address of a service purchased in the completed transaction.

15. The server of claim 13, wherein identifying the one or more geotagged digital photographs taken by the mobile device includes:

extracting one or more mobile device identifiers from the one or more geotagged digital photographs; and determining that the one or more mobile device identifiers match a device identifier of the mobile device associated with the user.

16. The server of claim 13, wherein the one or more geotagged digital photographs further comprise geotagged digital photographs in which the user is identified through:
   user tagging, or
   facial recognition.

17. The server of claim 13, wherein the method further comprises:
   extracting, by the processor, photograph time periods from each of the one or more geotagged digital photographs and determining threshold time periods from each of the one or more photograph time periods; and
   determining that the transaction time period is not within the threshold time periods of one or more of the photograph time periods.

18. The server of claim 13, wherein the one or more geotagged digital photographs are stored on a device that is separate from the mobile device.

\* \* \* \* \*